United States Patent [19]

Valyi

[11] 4,109,813
[45] Aug. 29, 1978

[54] COMPOSITE PLASTIC CONTAINER

[76] Inventor: Emery I. Valyi, 5200 Sycamore Ave., New York, N.Y. 10471

[21] Appl. No.: 592,551

[22] Filed: Jul. 2, 1975

Related U.S. Application Data

[60] Continuation of Ser. No. 343,498, Mar. 21, 1973, abandoned, which is a division of Ser. No. 186,984, Oct. 6, 1971, Pat. No. 3,787,157, which is a continuation-in-part of Ser. No. 71,734, Jul. 14, 1970, Pat. No. 3,717,544, and Ser. No. 100,050, Dec. 21, 1970, Pat. No. 3,719,735.

[51] Int. Cl.² ..................... B65D 25/34; B65D 47/10
[52] U.S. Cl. ..................... 215/1 C; 206/459; 206/524.2; 206/601; 220/453; 222/541
[58] Field of Search .............. 220/63 R, 83, 9 R; 215/1 C; 264/89; 222/541, 107; 206/524.2, 459, 601

[56] References Cited

U.S. PATENT DOCUMENTS

| | | | |
|---|---|---|---|
| 2,781,551 | 2/1957 | Richerod | 264/94 |
| 3,091,000 | 5/1963 | Makowski | 264/97 |
| 3,221,954 | 12/1965 | Lux | 215/1 C |
| 3,354,603 | 11/1967 | Katzen | 215/1 C |
| 3,354,881 | 11/1967 | Bloch | 215/1 C |
| 3,409,710 | 5/1968 | Klygis | 215/1 C |
| 3,415,402 | 12/1968 | Webber | 215/1 C |
| 3,426,940 | 2/1969 | Broerman | 220/83 |
| 3,457,337 | 7/1969 | Tarner | 215/1 C |
| 3,557,827 | 1/1971 | Marsh | 220/3 |
| 3,770,860 | 11/1973 | Amberg et al. | 264/89 |

Primary Examiner—Alan Shoap
Assistant Examiner—William Price
Attorney, Agent, or Firm—Robert H. Bachman

[57] ABSTRACT

Plastic articles and apparatus for making the same in which a preformed sleeve is placed over a core, a parison is injected around the core and sleeve in a parison mold and the parison is blown in a blow mold together with the sleeve.

8 Claims, 14 Drawing Figures

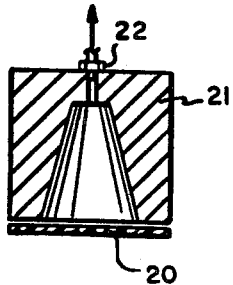
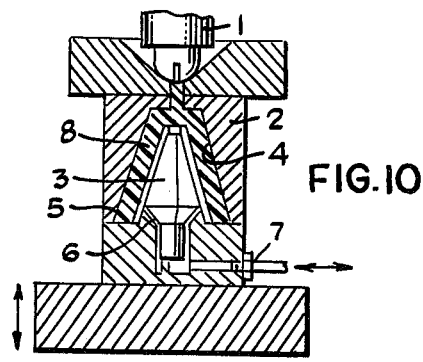
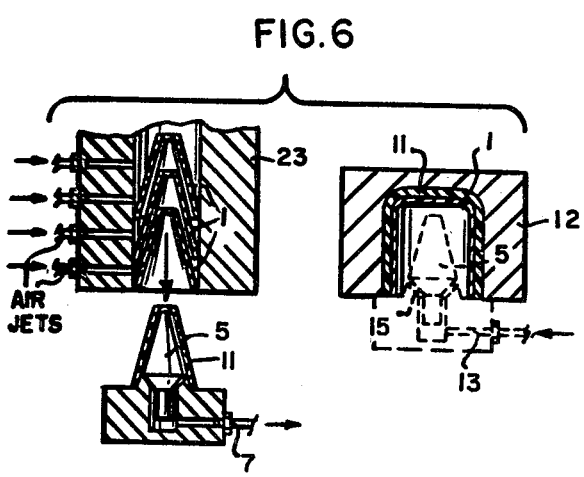
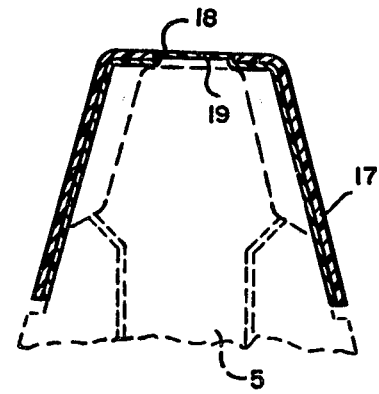
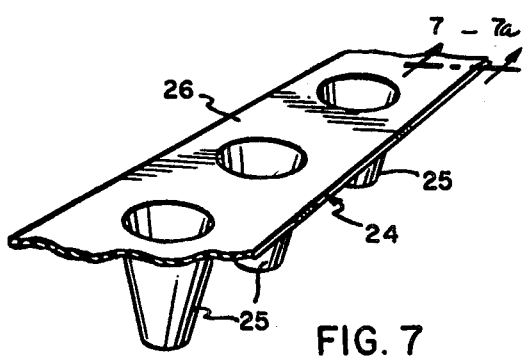
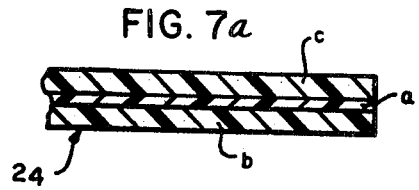
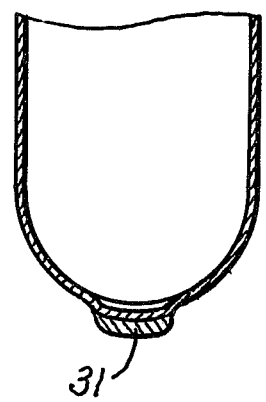
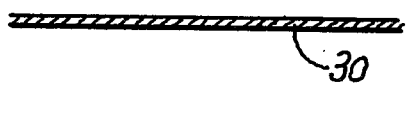

COMPOSITE PLASTIC CONTAINER

CROSS REFERENCE TO RELATED APPLICATIONS

This application is a continuation of application Ser. No. 343,498, filed Mar. 21, 1973, now abandoned which in turn is a division of application Ser. No. 186,984, filed Oct. 6, 1971, now U.S. Pat. No. 3,787,157, which in turn is a continuation-in-part of application Ser. No. 71,734, filed Sept. 14, 1970, now U.S. Pat. No. 3,717,544 and of application Ser. No. 100,050, filed Dec. 21, 1970, now U.S. Pat. No. 3,719,735.

This invention relates to plastic containers or the like that are formed in a blow mold from a pressure molded, closed-end parison and to apparatus for the manufacture thereof.

In the method of blow molding plastic hollow articles from parisons made by pressure molding, such as by injection molding or compression molding, the parison is molded in a parison mold around a core. The core may be a blow core and may then be removed together with the parison from the parison mold to a blow mold while the latter is still deformable and the parison is expanded into conformance with the blow mold by applying fluid pressure through the blow core to the inside of the parison. Alternatively, the parison may be removed from the core, stored, if so desired, then heated to a temperature sufficient to render it deformable and expanded by fluid pressure into conformance with the blow mold. Such procedures are known as injection blow molding.

Injection blow molding has many advantages compared to other processes fo the production of hollow plastic articles, such as the high dimensional accuracy of the product, the versatility of the process as to the variety of materials processed and its ability to make finished articles without the need for subsequent operations and without waste. It also exhibits difficulties that are related to the production of the parisons, as for example described in my paper entitled "Tools for Injection-Blow Molding", published in the SPE Journal, Vol. 23, No. 7, pp. 38–41, July, 1967.

It has been recognized that the quality of blown hollow articles made from pressure-molded parisons depends in large measure upon the dimensional accuracy of the parison immediately preceding the blowing step and upon the predetermined distribution of its temperature. Such dimensional accuracy and temperature distribution are difficult to control, particularly when the parisons to be molded are long in relation to their diameters. The dimensions and the temperature of the parison are largely determined by the mold in which it is made and particularly by the blow core. The blow core may be subject to rapid movement over appreciable distances in the course of each molding cycle. Its size is frequently not sufficient to accommodate efficient means for the control of its temperature and to resist the pressure of the plastic during injection without deflecting. The choice of materials from which blow cores may be made is limited by the need to withstand the erosive action of the plastic during repeated molding cycles to tool steels and the like which do not have sufficient heat conductivity to facilitate temperature control. In addition, the fluid orifice of the blow core must be prevented from clogging and thereby adversely influencing the expansion of the parisons.

It has been attempted in the past to overcome these difficulties caused by blow cores. Thus, my U.S. Pat. No. 3,526,687 is directed to the prevention of clogging of the blow orifice. U.S. Pat. No. 3,305,892 describes a procedure for molding parisons while stabilizing the blow cores to prevent their deformation. U.S. Pat. No. 3,339,231 shows procedures for controlling the temperature of blow cores.

As an improvement over these expedients, the respective difficulties are overcome in accordance with the present invention by protecting the blow core from the influence of the hot plastic that is brought into contact with it at high pressure in the course of the parison molding step. For that purpose the core is covered with a closely fitting preformed plastic sleeve that is compatible with the plastic from which the parison is to be made. The sleeve separates the core from the oncoming hot plastic. The sleeve also insulates the blow core from the heat of the plastic which would otherwise come into direct contact with the blow core and protects the blow orifice from clogging by molten plastic. The blow core, surrounded by the sleeve, may be supported by holding it in pressure contact with selected areas of the parison mold. The hole or holes thereby produced in the injected parts of the parison do not result in discontinuities in the composite parison, because they are closed by the corresponding areas of the sleeve. Thus, the blow core may be supported without damaging the integrity of the parison.

The sleeve constitutes a lining within the parison and, after having been expanded with the parison into the blow mold, constitutes an inner lining within the blown article which therefore becomes a composite of the lining and the material that surrounds it. In addition to protecting the core, as above described, this procedure has the advantage of providing a composite article the walls of which may be composed of more than a single material. Thus they may be made of plastics having different characteristics which is particularly desirable when it is difficult to satisfy all of the requirements and specifications of the finished article by means of a single grade of plastic. For example, the low cost, easy formability and transparency of polystyrene would make this material suitable for containers for many food commodities; however, the oxygen permeability of polystyrene limits such use in connection with commodities that are damaged by oxidation. In such an instance the sleeve may be made of a material that is substantially less pervious to oxygen than polystyrene, such as for example, polyvinylidine chloride or acrylo-nitrile. By suitable choice of sleeve shapes and of the parison molding apparatus, it is possible to provide areas in the finished article in which the blown sleeve is exposed, or areas in which reinforcement of the article is obtained by means of the lining.

Illustrative embodiments of the invention are shown in the following drawings, in which:

FIG. 5 is a diagrammatic view of the forming mold in which a sleeve is formed,

FIG. 6 shows diagrammatically a holder for the stacked sleeves and a blow mold in relation to a blow core;

FIG. 7 is a perspective view of a portion of a web carrying a plurality of formed sleeves before severing and stacking.

FIG. 7a is a section taken on the line 7a—7a of FIG. 7 showing the laminated web;

FIG. 8 is a sectional view showing a dispensing type container having a continuous lining over the dispensing opening;

FIG. 9 is a section showing the web from which the sleeve of FIG. 9a is formed; and FI. 9a is a section showing a portion of the sleeve fromed from the web of FIG. 9.

Figure 1:
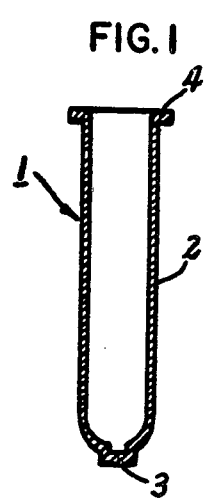
FIG. 1 is a longitudinal section of a sleeve adapted to surround a blow core of the type suitable for producing a blown bottle.

Referring to the drawings more in detail, FIG. 1 shows a sleeve 1 for the blow core to be used in the subsequent molding operation, having an inner surface closely approximating the outer surface of that blow core. The thickness of the sleeve may vary; thus, its side walls 2 may be very thin such as between 0.001 and 0.020 inches, while its bottom 3 may be twice to ten times as thick as the side walls and have a shape adapted to provide alignment with the parison mold. The rim 4 of the sleeve may conform to the top region of the hollow article to be made. Such sleeves may be produced from a variety of plastics at reasonable cost, by methods well known in the art, such as for example by thermoforming, powder coating and casting, these methods being described on pages 534; 594; and 602, respectively, of the 1969–1970 Modern Plastics Encyclopedia, published by McGraw-Hill, Inc.; and by other methods well known in the art of manufacturing thin-walled, shaped articles of plastic. They may be single pieces or joined assemblies of several pieces.

One method of forming the sleeves 1 is illustrated in FIGS. 5, 6 and 7, wherein a sheet 20 of the material from which the sleeve is to be made, after being heated to a temperature at which that material becomes deformable, is placed into juxtaposition with a sleeve mold 21, vacuum is applied in the mold cavity of the sleeve mold through connection 22 and the sheet converted into the desired shape by vacuum forming, i.e. by a drawing process that intrinsically produces attenuation of the sheet. Instead of drawing the sheet into a sleeve mold, it may of course by drawn by vacuum over a core-shaped plug or produced be cooperation of a mold and a plug as is known in the thermoforming art.

Thus, an undeformed web 30 may be brought into juxtaposition with the blow core 5 and the blow core used to form the sleeve from the web, whereby the blow core as well as the web may be suitably heated. In thermoforming the sleeve in this manner the end of the sleeve is substantially less deformed than the side walls which are formed by severe drawing with a consequent reduction in thickness. Several sleeves so formed may now be stacked and placed into a holding fixture 23, shown in FIG. 6, which may be brought into alignment with a blow core 5 of an injection blow molding apparatus. The forming of the sleeve 1 may be one at a time or continuous, both methods being well known in the art. If it is continuous, the product of the forming operation may correspond to the formed web 24 shown in FIG. 7 in which portions 25 that are shaped to correspond to the forming mold 21 of FIG. 5 are joined by parts of the undeformed web 26. As an alternate to placing the sleeves into a holding fixture 23, as in FIG. 6, such a web 26 may be fed over the blow core 5 in a manner such that one formed portion 25 after another is brought into juxtaposition with blow core 5. Obviously, the formed sleeves must be severed from web 26; however, this may be done before or after placing the sleeves 1 over the blow core 5.

The sheet 20 in FIG. 5, the web 24 in FIG. 7, and the web 30 of FIG. 9 may be a composite of two or more layers of different materials as shown in FIG. 7a.

The tool by which the sheet or web is drawn may be the blow core of the parison mold. More conveniently it is a separate element from which the formed sleeve is stripped, usually stored, as by stacking and subsequently applied to the blow core of the molding apparatus as needed. The sleeve molding apparatus may include one such tool or may include a plurality thereof.

Thus the sleeves 1 may be placed into a holding fixture 23 shown in FIG. 6, to be transferred onto the blow core 5. One procedure to cause them to adhere firmly to the blow core 5 may consist of the following: After the fixture 23 and the blow core 5 are aligned, the blow core is inserted relatively loosely into the first sleeve in the stack. The sleeves in the fixture are not firmly stacked and may, if necessary, be kept slightly separated one from the other by jets of air acting between the sleeves. Once the blow core 5 is thus inserted, vacuum may be applied through the blow slot 15 with which the core is equipped to blow the parison into final shape and the sleeve thereby caused to be pressed against the blow core so that it will then remain attached thereto. Thereafter the blow core 5, with the sleeve adhering, is removed from the fixture 23 which may be shifted to the side. Holding fixture 23 may of course be arranged to carry only a single sleeve 1 which, in that case, would be inserted into the fixture at a storage station alongside the assembly, for transfer onto the blow core.

Figure 2:
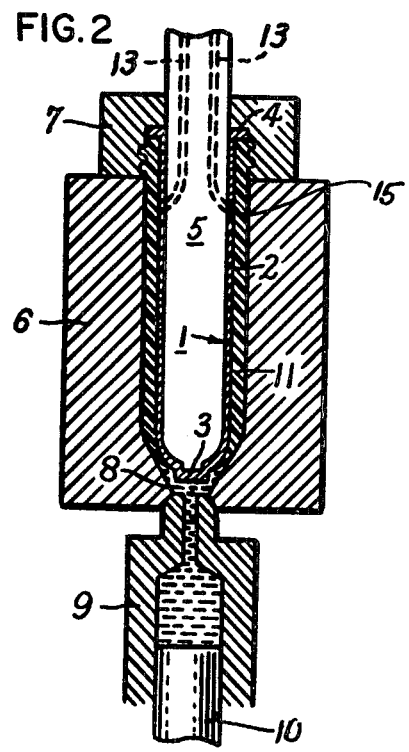
FIG. 2 is a longitudinal section with parts in elevation of a parison mold showing the blow core covered by the sleeve of FIG. 1.

FIG. 2 shows a parison mold which consists of blow core 5 carrying the sleeve 1 and a parison mold 6, the core and the mold usually being heated by conventional means (not shown), and a tool for the forming of the open end of the hollow article, shown as a neck ring 7 which is usually cooled. A passage 8 connects the parison mold 6 with a supply of hot plastic contained within cylinder 9 from which the molten plastic may be pressed into parison mold 6 by piston 10 under sufficient pressure to effect rapid filling of the space between the blow core 5 and the parison mold 6 and the space within neck ring 7 communicating with the parison mold. The hot plastic heats the sleeve from the outside and the sleeve may be heated from the inside as well if the core 5 is heated.

Figure 3:
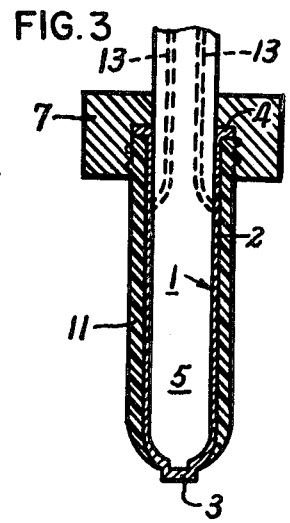
FIG. 3 is a longitudinal section showing the blow core retracted from the parison mold with the parison thereon.

The parison 11, being a composite containing the sleeve 1, as molded in the apparatus shown in FIG. 2, may be removed from the parison mold 6 while hot enough to be deformed, together with the blow core 5 and the neck ring 7, as shown in FIG. 3 and inserted into a blow mold 12. Pressure fluid obtained from a source not shown may be admitted through fluid passages 13 communicating with blow slots 15 to the interior of parison 11. The blow mold 12 hhas a mold cavity 14 corresponding to the shape of the hollow article to be made and it may be made of two halves which are separable when necessary for the removal of the finished article to be made therein.

The above indicated movements of the blow core may for example be carried out by apparatus shown in U.S. Pat. Nos. 2,298,716; 3,100,913; 3,183,552; and in my U.S. Pat. No. 3,029,468. In any such apparatus, one or more blow cores may be used simultaneously and they may be moved from one operating position to another individually or in groups of several blow cores.

In operation of this method, sleeves according to FIG. 1 may be produced by any of the procedures referred to before, independently of the injection blow molding operation here described. Alternatively, sleeves may also be fashioned in place, as for example by applying plastic film stock tightly to the core 5. The sleeve material must have deformation characteristics that equal or exceed those of the parison material, at the temperatures normally maintained for expanding the parison into the blow mold cavity 14.

Instead of removal from the parison mold while hot and immediate transfer into the blow mold for blowing, as above described, composite parisons may, if desired, be made independently and stored before being expanded in the blow mold. In such a procedure the parisons may be produced on a core which is not a blow core, removed from such core to storage, and may be reheated before blowing, as by inserting a heated plug in the parison which may conform to the entire inside surface of the parison or only to a portion thereof. The plug may have blow ports for blowing the parison into the blow mold. Alternatively, the parisons may be reheated from the outside, as in a convection oven or by radiant or other heaters which are shaped to provide efficient heating of the parison. The parisons may be passed through such oven or heaters on heated pins which are inserted in the parison, or by other suitable means, and may be heated in various other ways which are known in the art.

The sleeve will generally adhere to the present molded portion of the parison and may at times be capable of bonding thereto at the temperature normally used for molding the latter material. To facilitate such bonding, the outside surface of the sleeve 1 that is to come into contact with the pressure molded plastic of the parison 11 may be treated by procedures that are known in the art to promote the adhesion of plastic surfaces. For example, if the sleeve is to be made of polyethylene, its outside surface may be flame treated; in other instances, it may be rendered tacky by application of a solvent prior to parison injection. Alternatively, the sleeve may be formed from laminated stock containing an outside layer that has adhesive properties, in such a way that the surface of the sleeve to come into contact in the injected plastic is capable of bonding thereto.

Although the sleeves 1 will in most instances be made of plastic, it is also possible to make them partly or wholly of other materials, such as for example of extensible metal foil, or of elastomers.

In addition to being composed of multi-layered or laminated stock, sleeve 1 may be made of more than one material in its parts. For example, the sleeve side walls 2 may be made of a material that is different from the material in the sleeve bottom 3 which may, at times, be provided with a reinforcement for better support of the parison.

Figure 2A:
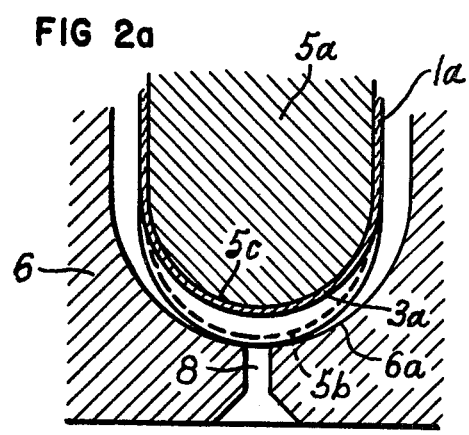
FIG. 2a is a sectional view showing a modified type of blow core and parison mold with a centering tip.
Figure 2B:
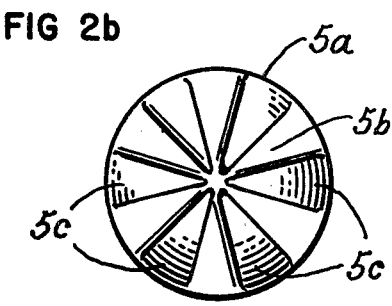
FIG. 2b is a bottom view of the blow core shown in FIG. 2a showing the arrangement of the injection passages.

When in place within the parison mold, the tip of the blow core, surrounded by the bottom 3 of the sleeve may be held firmly against the corresponding bottom wall of the parison mold, as for example whenever it is desired to stabilize the blow core. Such an arrangement is shown in FIGS. 2a and 2b, wherein the blow core 5a is formed at its end with a tip 5b to which the end portion 3a of the sleeve 1a conforms and which is adapted to seat against the end wall 6a of the parison mold 6 and to at least span the open end of the injection passage 8. When so seated, the tip 5b serves as a centering means to hold the blow core 5a centered with respect to the parison mold 6. The surface of the tip 5b of the blow core 5a may be provided with a series of radial grooves 5c for the passage of the injected plastic from the injection passage 8. The sleeve 1a may be caused to conform to these end surfaces so that free passages are provided for the flow of the plastic.

In this embodiment the sleeve 1a is continuous over the bottom surface of the parison, and the injected plastic forms a continuous bottom wall except for the contacting areas between the tip 5b and the bottom wall 6a of the parison mold.

In order to form a bottom wall of increased thickness, an additional disc 31 may be attached to the sleeve in the area of the tip 3a so as to provide a bottom wall of substantial thickness for the parison as indicated in FIG. 9a, which illustrates a portion of the sleeve which is thermoformed from the web of FIG. 9. The piece 31 may be attached to the end of the sleeve after forming, or may be attached to the web before the sleeve is formed therefrom.

After the blow core is in place, hot plastic is injected into the parison mold through orifice 3 under action of piston 10 operating in pressure cylinder 9. After injection, the hot plastic surrounds the sleeve 1 under pressure. Due to the intimate contact established thereby between the hot plastic and the exposed surface of the sleeve, the sleeve is rapidly heated until its temperature approaches that of the injected plastic. At that temperature, adhesion of the two materials is usually facilitated and the material of the sleeve is moreover heated sufficiently to render the sleeve deformable at the same rate as the injected plastic. Accordingly, the sleeve combines with the injected plastic to form the composite parison 11.

After it is placed over the blow core 5, the sleeve 1 may cover the fluid passages 13 which are accordingly protected from the entry of plastic injected in the course of parison molding. Therefore, construction of the blow core is simplified and its operation rendered more reliable.

During the injection step, the blow core 5 is insulated from the hot plastic and protected from the friction of the plastic flowing at high velocity and pressure around the blow core.

It is at times beneficial to heat the sleeve prior to expansion by blowing, from the inside as well as from the outside as by the freshly injected plastic of the parison. This may be readily accomplished by constructing the blow core of a metal that is a good conductor of heat. A comparatively soft but well conducting metal such as aluminum may be used, since it does not have to withstand the erosive effect of the plastic during injection; such a blow core may be heated electrically instead of by fluid circulation, as is common in injection blow molding to offset the temperature gradient otherwise caused by repeated injection of plastic.

Figure 4:
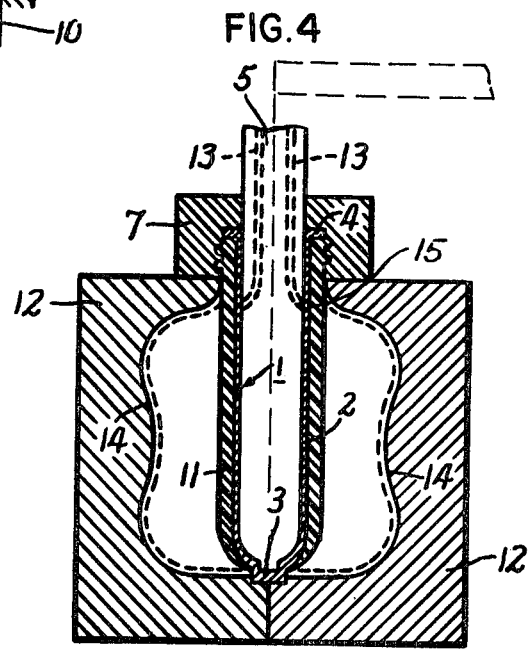
FIG. 4 is a similar view showing the blow core in blow position within a blow mold having a cavity shaped to form a bottle.

After forming of the parison by injection and the joining of the sleeve to the injected plastic, the blow core 5 is removed from the parison mold together with the neck ring 7 and with the parison 11 thereon, as shown in FIG. 3. It is next inserted into the blow mold 12, shown in FIG. 4.

For accurate location of the blow core 5 in the blow mold 12, the blow core may be pressed against the bottom of the blow mold, with the composite parison bottom or the sleeve bottom 3 therebetween, as the case may be. Thus, the blow core is maintained in alignment in the blow mold, the same as it was in the parison mold. As the next step, pressure fluid, usually compressed air, is admitted into the composite parison through fluid passage 13 and blow slot 15 and the parison is expanded into the blow mold 12, to assume the shape of the blow mold cavity 14, as indicated by dotted lines in FIG. 4. Fluid pressure is maintained until the blow article cools sufficiently in contact with the walls of the blow mold 12, to be removed therefrom.

An important advantage of incorporating a sleeve 1 on the inside of a parison and to form a composite article therefrom is to impart properties to the finished article 10 single plastic alone does not possess. For example, polyvinylidine chloride, acrylo-nitrile polymers and certain other plastics provide excellent oxygen barrier properties, however only at appreciable expense; on the other hand, polystyrene is relatively inexpensive, has desirable mechanical properties but is at the same time very pervious to oxygen. In order to produce comparatively inexpensive containers having good resistance to oxygen permeation, a thin sleeve of the expensive plastic which is impervious may be employed in conjunction with polystyrene which is to constitute the bulk of the finished article.

Certain plastics, for example, polyvinylidene chloride, are difficult to handle in some of the operations described because of their tendency to collapse or to stick together. In order to facilitate the handling of such materials, the sleeves themselves may be made as composites from laminated film in which such difficult-to-handle material is carried by or between another plastic which is readily handled or which protects from collapse as the case may be.

Another important reason for the use of laminated sleeves is to provide additional combinations of properties, such as solvent resistance, resistance to gas transmission and the ability to adhere to the plastic molded around the sleeve. Such a combination may be obtained, for example, by making the sleeve from a laminated film composed of layers of polyethylene, polyvinyl chloride, polyvinylidene chloride and polystyrene and surrounding the sleeve with polystyrene in the course of parison injection. Many of the plastics that have good gas barrier or solvent resistance properties are too expensive for the production of rigid walled commercial containers, such as for example, acetal polymers, ionomer resins, polyallomer copolymers, polycarbonates, polypropylene, polyvinylidene chloride, acrylonitrile and methacrylnitrile polymers, nylon and others, while other plastics, such as polystyrene and polyethylene are inexpensive, but do not have sufficient barrier or solvent resistance properties. In many instances the material having the properties desired for a given purpose, may not be directly compatible with the material from which the bulk of the container is to be made and therefore requires a further layer between itself and the bulk of the container, which layer is compatible with both.

It is thus seen that the sleeves may be designed as laminates or multi-layered structures to satisfy a multiplicity of requirements determined by the process of manufacture of the finished article or by the finished article itself.

FIG. 7a shows, as an example of such a laminated film from which a multi-layered sleeve may be made a cross section composed of layers a, b, c, each of which may be made of different materials having different properties from which to form sleeves that are, for example, readily handled and that have the desired predetermined combination of properties. Of course, any required number of layers may be employed according to the result desired, not only the three layers shown in FIG. 7a.

Whenever the material of the sleeve is to be relied upon to provide a gas transmission or solubility barrier inside the finished container, it is important to know whether the material so relied upon is indeed present throughout the area to be protected. In order to inspect the finished article in keeping with this requirement, the sleeve may be made of a material that is colored differently than the material injected around the sleeve, whereby the latter is also made transparent or translucent. In this manner any discontinuity in the protective sleeve material may be readily discovered in the finished article, by optical inspection.

Alternatively, the two materials may be made to differ as to their radiation transmission properties, such as for example, ultraviolet radiation and the corresponding inspection effected by known means to detect the respective radiation intensity.

The sleeves may of course be also inspected prior to the molding operation shown in FIG. 2 by conventional means.

It is also possible to produce finished articles having desirable appearance by providing different colors and degrees of transparency in the sleeve and in the material that is injected around it.

Usually, the container to be made is provided with a continuous layer over its entire inside surface. Occasionally, however, some portions of the container should remain without such a layer. In such instances, the sleeve is made with the corresponding wall area omitted.

In other cases, it is desired to have the inner layer cover areas in which there is an opening in the container, for example at a dispensing opening, so as to keep the contents sealed until the container is first used, such as for example, under a closures of a powder container with a sifter top.

Such containers may be made as indicated in FIG. 8 by applying a sleeve over the entire core, injecting the plastic only over selected portions of the core and then blowing the composite parison into the desired shape to produce the finished article 17, having a discontinuity 18 covered with the film 19.

What is claimed is:

1. A blown, seamless multilayered, hollow plastic container defining a dispensing container having bottom portion and an opposed dispensing mouth portion, said container having a bottom portion comprising at least a rim and wall portions integral therewith comprising side walls extending from said rim and terminating in an end wall opposite said rim defining a dispensing mouth, said container having an inner thermoplastic layer, and an outer seamless pressure molded layer, the two layers being adhered one to the other substantially throughout their contacting surfaces, wherein the end wall portion of one of said layers has a discontinuity, said discontinuity being completely filled by the material of the other of said layers which completely covers said mouth, and wherein the inner and outer layers are continuous throughout the extent thereof and are coextensive with each other except for said discontinuity, whereby a dispensing opening is formed when said end wall discontinuity is broken.

2. A container according to claim 1 in which a predetermined portion of the inner layer is formed with an increased thickness.

3. A container according to claim 2 in which said increased thickness is formed by a separate member attached to the wall of said inner layer.

4. A container according to claim 1 having an open rim portion integral with said side walls.

5. A container according to claim 1 wherein said inner layer is a drawn thermoplastic layer.

6. A container according to claim 1 wherein said inner layer is multilayered.

7. A container according to claim 1 wherein the end wall of said outer layer has a discontinuity therein.

8. A container according to claim 1 wherein said side walls extend vertically upward from said rim or bottom portion.

* * * * *